United States Patent
Namba et al.

(10) Patent No.: US 7,278,922 B2
(45) Date of Patent: Oct. 9, 2007

(54) OPERATION SUPPRESSION PROGRAM, OPERATION SUPPRESSION METHOD, AND VIDEO GAME DEVICE

(75) Inventors: Kazuhiro Namba, Amagasaki (JP); Norio Nakayama, Minato-ku (JP)

(73) Assignee: Konami Computer Entertainment Studios, Inc., Tokyo (JP)

( * ) Notice: Subject to any disclaimer, the term of this patent is extended or adjusted under 35 U.S.C. 154(b) by 335 days.

(21) Appl. No.: 10/502,264

(22) PCT Filed: Feb. 18, 2003

(86) PCT No.: PCT/JP03/01679

§ 371 (c)(1),
(2), (4) Date: Jul. 22, 2004

(87) PCT Pub. No.: WO03/072213

PCT Pub. Date: Sep. 4, 2003

(65) Prior Publication Data

US 2005/0070357 A1    Mar. 31, 2005

(30) Foreign Application Priority Data

Feb. 27, 2002   (JP) .............................. 2002-052204

(51) Int. Cl.
    *A63F 13/00*   (2006.01)
(52) U.S. Cl. ....................................................... 463/43
(58) Field of Classification Search .................... 463/1, 463/29, 30, 37, 43, 31, 36
See application file for complete search history.

(56) References Cited

U.S. PATENT DOCUMENTS

| | | | |
|---|---|---|---|
| 5,941,774 A | * | 8/1999 | Takemoto et al. ............. 463/31 |
| 2001/0007825 A1 | * | 7/2001 | Harada et al. .................. 463/7 |
| 2003/0073473 A1 | * | 4/2003 | Mori .............................. 463/6 |

FOREIGN PATENT DOCUMENTS

| | | |
|---|---|---|
| EP | 768598 | 4/1997 |
| JP | 7-178239 | 7/1995 |
| JP | 11-114225 | 4/1999 |
| JP | 11114225 | * 4/1999 |
| JP | 2000-211832 | 8/2000 |
| JP | 2002-52255 | 2/2002 |

OTHER PUBLICATIONS

International Preliminary Examining Report dated Feb. 3, 2004.

* cited by examiner

*Primary Examiner*—Kim Nguyen
(74) *Attorney, Agent, or Firm*—Jordan and Hamburg LLP

(57) ABSTRACT

A manipulation suppression program, a manipulation suppression method and a video game machine are provided which are capable of suppressing an inhibited act that is conducted by a user. A main-game execution section executes a main game; while the main game is executed, an inhibited-act detection section detects a manipulation by a user being a preset inhibited act; and if the inhibited act is detected by the inhibited-act detection section, a suppression-information presentation section displays, in a display section, a suppression picture which prompts the user to suppress the inhibited act.

2 Claims, 10 Drawing Sheets

OPERATION SUPPRESSION PROGRAM, OPERATION SUPPRESSION METHOD, AND VIDEO GAME DEVICE

TECHNICAL FIELD

The present invention relates to a manipulation suppression program, a manipulation suppression method and a video game machine, which are capable of suppressing a manipulation by a user.

BACKGROUND ART

In recent years, mobile communication terminals have more and more functions, and thus, you can spot everywhere cellular phones with video-game functions. Among such cellular phones, there is the one in which video-game programs are stored in advance. Another type of cellular phone receives, using the phone's function of connecting with the Internet, video-game programs from a server for video-game providers, and executes those video-game programs.

In addition, as cellular phones have more functions, a Java execution environment for a small device such as a cellular phone can be realized. Hence, various video-game programs have been developed in a Java language which is one of program languages, and provided as Java applet. In cellular phones which have such a video-game function in the Java language, more advanced and complex video games than those at present will be able to be realized.

When a user plays a video game, the user usually tends to push down a specific button continually and repeatedly. This takes place while the user is concentrating his/her energies upon a certain scene of the video game, or while the user is on standby for his/her input manipulation. For example, in the case where a user allows a pitcher character to make a pitching motion in a baseball game, the user may be absorbed heavily in the video game, and thus, may continue pressing a button which corresponds to the pitching motion, over and over again until the pitching motion is completed.

However, cellular phones are light and small so that they can be easily carried. Thus, in the case where a user plays a video game using a cellular phone, if the user pushes down a specific button of the cellular phone continually and repeatedly too much, that may damage the button of the cellular phone in respect of its endurance, and thus, may shorten the life of the cellular phone itself. Therefore, such a continual and repeated pushing-down manipulation is defined as an inhibited act in the manual or the like of a cellular phone. As a matter of fact, however, this is not necessarily observed when a user is into a video game.

DISCLOSURE OF THE INVENTION

In order to resolve the above described disadvantage, it is an object of the present invention to provide an art and an apparatus which are capable of suppressing an inhibited act by a user.

According to an aspect of the present invention, in order to suppress a predetermined manipulation by a user, a manipulation by the user is detected being a preset inhibited act, and if the inhibited act is detected by this detection, a predetermined operation which suppresses the inhibited act of the user is executed.

Further objects, features and advantages of the present invention will be evident in the following description with reference to the attached drawings.

BRIEF DESCRIPTION OF THE DRAWINGS

FIG. 9 is a flow chart, showing still another embodiment of manipulation suppression processing by the cellular phone shown in. FIG. 2.

BEST MODE FOR IMPLEMENTING THE INVENTION

A network game system using a cellular phone which has a video-game function according to an embodiment of the present invention will be described with reference to the drawings.

Figure 1:
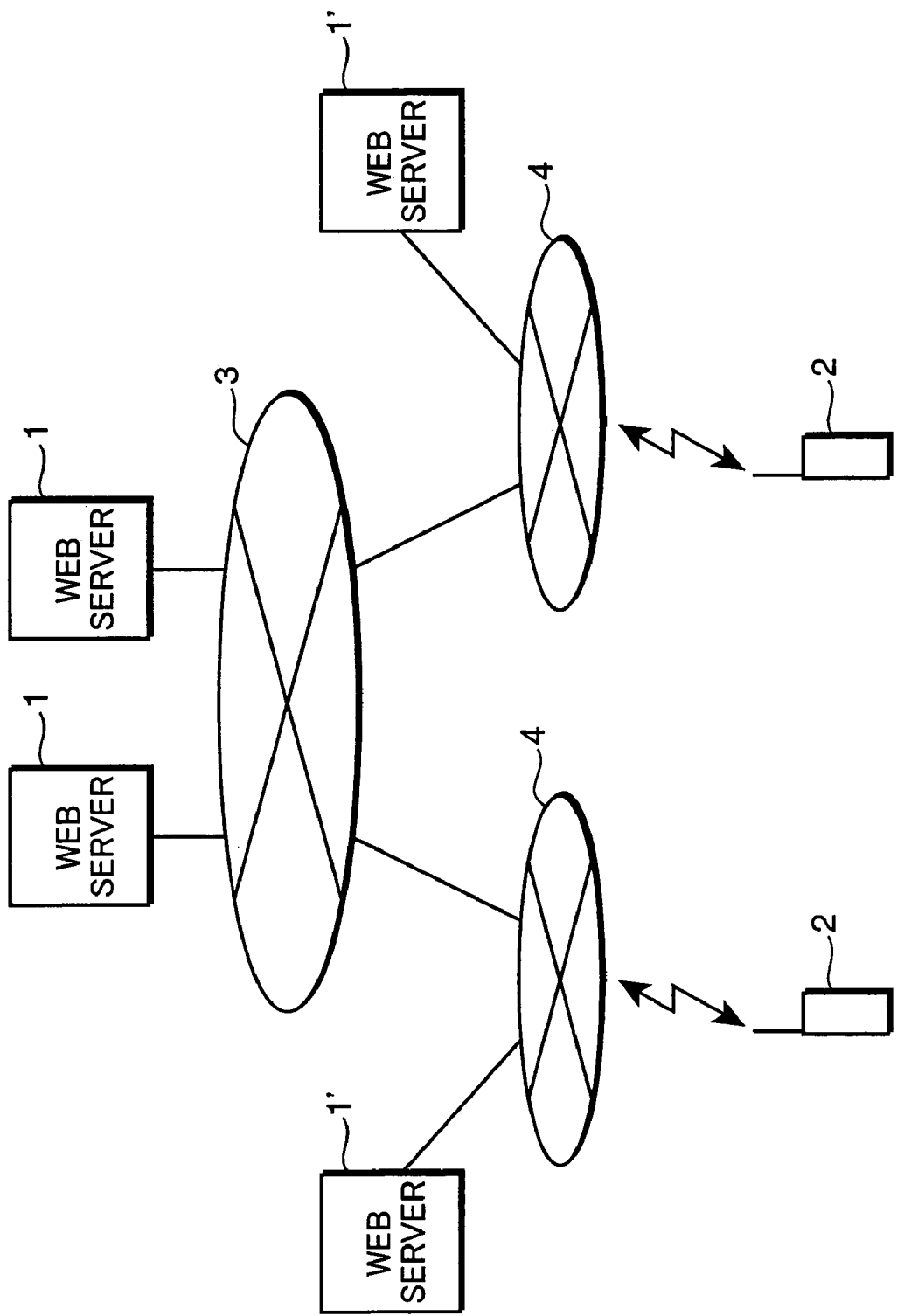
FIG. 1 is a representation, showing the configuration of a network game system using cellular phones according to an embodiment of the present invention.

FIG. 1 shows the configuration of such a network game system. In the figure, the network game system includes Web servers 1, 1' and a cellular phone 2. The Web servers 1, 1' and a cellular phone 2 are connected over a network 3 and a cellular-phone network 4, so that they can communicate with each other. Each cellular phone 2 has a video-game function, and the Web servers 1 and 1' are video-game server units which manage a video game which is played using the cellular phone 2 by a user. Herein, the Web servers 1 and 1' may also be server systems, including a database server, a mail server, or the like.

The Web servers 1 and 1' are administered by an Internet service provider, for example, a video-game company or the like. These Web servers 1 and 1' mainly distribute a video-game program, transmit game data to each user and receive it from them, and manage it. The video-game program is created in a language which corresponds to the specification of each cellular phone 2. According to this embodiment, it is provided with Java applet which is created in a Java language which is one of program languages.

The cellular phone 2 can be connected to the Internet and is a terminal unit with which a user plays a video game. As this terminal unit, instead of the cellular phone 2, a PHS (or personal handy-phone system), a PDA (or personal data assistance), a video game machine with a communication function, a personal computer with a communication function, or the like, may also be used.

As the network 3, for example, the Internet is used. According to a TCP/IP (or transmission control protocol/Internet protocol), various pieces of information and the like are transmitted and received between the Web server 1 and the cellular phone 2. Herein, the network 3 is not limited especially to the Internet. Thus, another type of network, a network which is formed by combining various networks, or the like, may also be used.

As the cellular-phone network 4, for example, a packet communication network which is provided by a mobile communication company is used. It is connected to the cellular phone 2, via a base station (which is omitted in the figure) of a mobile communication company which is contracted by each user, or the like. The network 3 and the cellular-phone network 4 are connected via a gateway server (which is omitted in the figure), or the like. The gateway server is used to convert a communication protocol, so that a video game program which is provided using the network 3 by the Web server 1 can be used by the cellular phone 2. In addition, the Web server 1' and the cellular-phone network 4 may also be connected each other, via a leased line.

Hereinafter, the distribution of a video game program by the Web server 1 will be described in brief. Herein, the distribution of a video game program by the Web server 1' is the same as that of the Web server 1, and thus, its description is omitted. Using the browser of the cellular phone 2, a user accesses the Web server 1 via the cellular-phone network 4 and the network 3. The Web server 1 receives a download request by the cellular phone 2 and distributes Java applet which is a predetermined game program. The cellular phone 2 installs the Java applet which has been downloaded. In this way, the Java applet is installed in the cellular phone 2, and thereby, the user can play a video game without communicating with the Web server 1.

Figure 2:
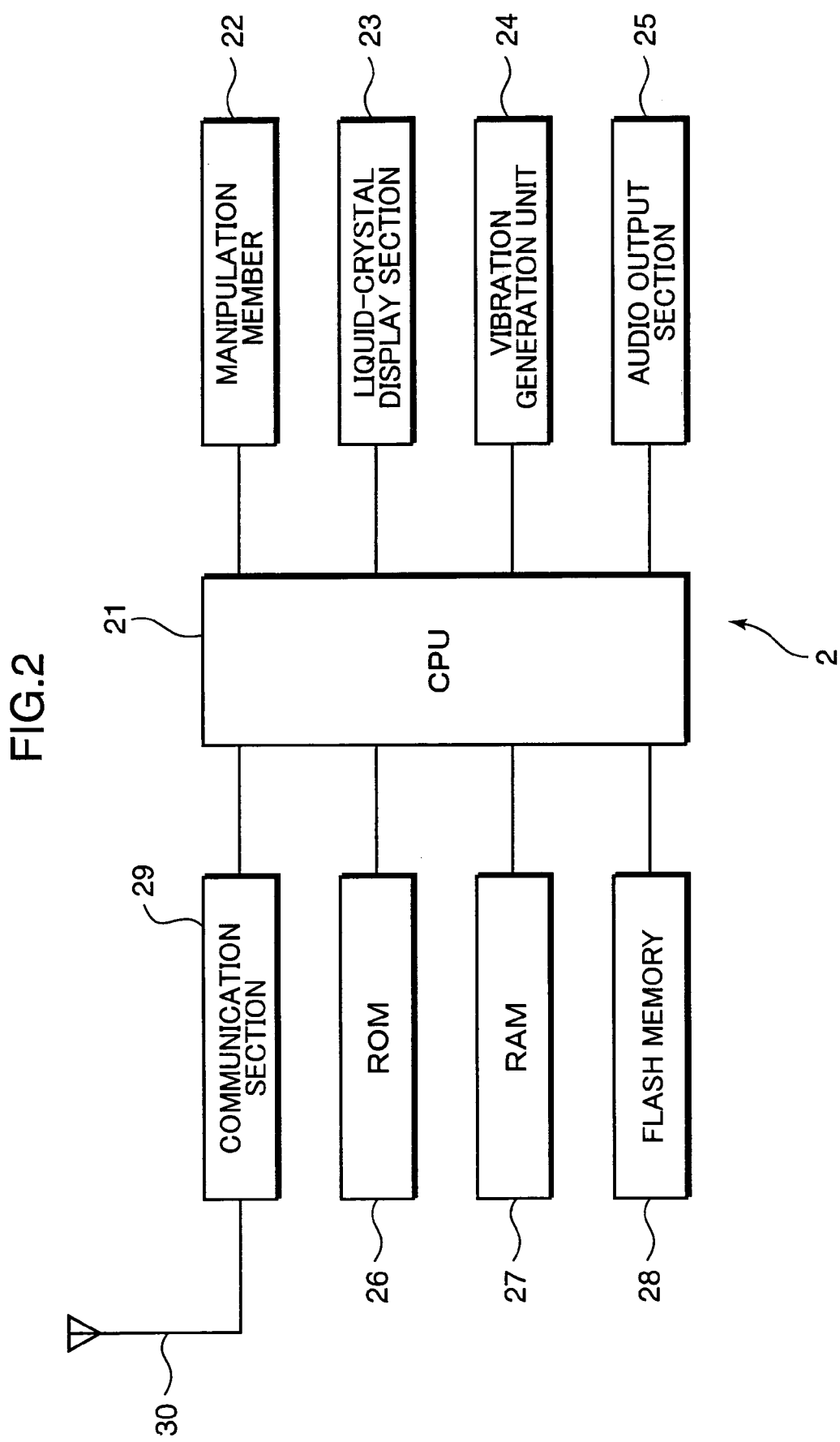
FIG. 2 is a block diagram, showing main functions of a cellular phone.

FIG. 2 is a block diagram, showing main functions of the cellular phone 2. Herein, in FIG. 2, only functions necessary for the present invention are extracted so that its description becomes easier. The cellular phone 2 includes a CPU (or central processing unit) 21. This CPU 21 is connected to: a manipulation member 22; a liquid-crystal display section 23; a vibration generation unit 24; an audio output section 25; a ROM (or read only memory) 26; a RAM (or random access memory) 27; a flash memory 28; and a communication section 29.

In the ROM 26, there is stored beforehand a basic program which is used to operate the cellular phone 2, or the like. The RAM 27 is used as a work area of the CPU 21, or the like. The flash memory 28 is a rewritable nonvolatile memory, and stores the Java applet which is a video game program which has been downloaded from the Web server 1. Herein, the flash memory 28 has a storage area in which several kinds of Java applet are stored. A predetermined storage area is allocated for the video game program which has been downloaded from the Web server 1. In addition, if a video game program is stored beforehand in the cellular phone 2, that video game program is stored in the ROM 26. Besides, if a video game program is executed in a video game machine or a personal computer, the flash memory 28 is configured by a record medium, a record-medium drive and the like.

The CPU 21 reads a basic program or the like from the ROM 26, and also reads a video game program or the like from the flash memory 28. It executes game progress processing for conducting a main game, or the like.

The manipulation member 22 is configured by a ten-key to which numbers 0 to 9 are assigned, or the like. It accepts an input manipulation by a user and sends an input signal to the CPU 21. The CPU 21 moves a video game ahead, based on the input signal. Herein, if a video game program is executed in a video game machine, the manipulation member 22 is configured by a dedicated controller and the like.

If a video game program is executed in a personal computer, the manipulation member 22 is configured by a keyboard, a mouse and the like.

The liquid-crystal display section 23 displays a game picture. It is configured by using, for example, a TFT (thin film transistor) liquid-crystal panel, and it can make a display of 4096 colors. Herein, instead of the TFT liquid-crystal panel, the liquid-crystal display section 23 may also be an STN (super twisted nematic) liquid-crystal panel, an organic EL (electro luminescence) panel, or the like. If a video game program is executed in a personal computer or a video game machine, it is configured by a television monitor, a CRT (cathode-ray tube) display, a liquid-crystal display and the like.

The vibration generation unit 24 is a so-called vibrator. It rotates an eccentric cone for applying a vibration which is provided in the drive shaft of a drive motor, thereby outputs a vibration frequency according to the number of rotations, and vibrates the cellular phone 2. Herein, if a video game program is executed in a video game machine, the vibration generation unit 24 is incorporated into a controller which is a dedicated manipulation member.

The audio output section 25 is a so-called speaker, and outputs a sound and a voice from the cellular phone 2. Herein, if a video game program is executed in a personal computer or a video game machine, it is configured by a speaker which is incorporated into a television monitor, a CRT display, a liquid-crystal display and the like.

The communication section 29 executes circuit control of receiving from and transmission to an ordinary radio public circuit, handles transmission and receiving of voice data thereon, and processes data transmission and receiving which is used via the network 3 and the cellular-phone network 4, or the like. The transmitted and received data is given and received via an antenna 30. Herein, if a video game program is executed in a personal computer or a video game machine, there is no need for the antenna 30. The communication section 29 is configured by, for example, a modem, a router or the like, and is connected to the Web server 1 via the network 3.

Figure 3:
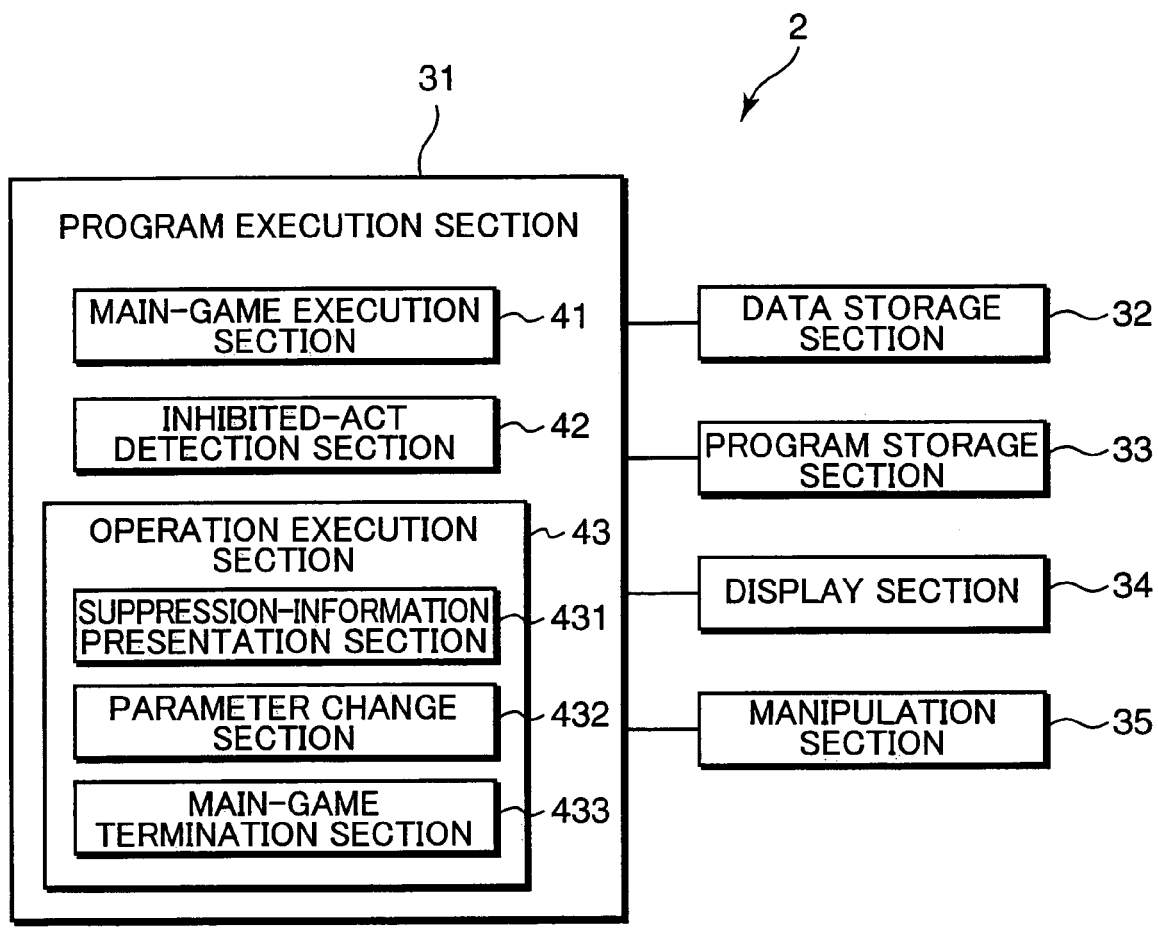
FIG. 3 is a block diagram, showing main functions as a video game machine of the cellular phone shown in FIG. 2.

FIG. 3 is a block diagram, showing main functions as a video game machine of the cellular phone 2 shown in FIG. 2. As shown in FIG. 3, the cellular phone 2 includes functionally: a program execution section 31; a data storage section 32; a program storage section 33; a display section 34; and a manipulation section 35. The program execution section 31 includes, as its functions, a main-game execution section 41, an inhibited-act detection section 42, and an operation execution section 43.

The program execution section 31 is implemented by the CPU 21 or the like. The CPU 21 executes various programs which are stored in the program storage section 33, and thereby, functions as the main-game execution section 41, the inhibited-act detection section 42 and the operation execution section 43.

The main-game execution section 41 accepts a manipulation by a user and executes a main game. According to this embodiment, the main game is a baseball game whose subject is baseball. This baseball game is simply described below. As the video game is going ahead, batting and fielding are repeated. At the time of batting, a user manipulates the manipulation member 22, so that a batter character makes a batting motion. At the time of fielding, the user manipulates the manipulation member 22, so that a pitcher character makes a pitching motion.

The inhibited-act detection section 42 detects a manipulation by the user which is performed while the main game is executed being a preset inhibited act. In addition, while the main game is executed as foreground processing, the inhibited-act detection section 42 detects, as background processing, an inhibited act by the user. The inhibited act according to this embodiment is a so-called repeated pushing act in which the user pushes continually and repeatedly a specific button of the manipulation member which is provided in the cellular phone 2.

Herein, in addition to the repeated pushing, the inhibited act includes an act which may adversely affect a video game machine, such as pressing a specific button of the manipulation member at or over a predetermined pressure and applying force from outside such as dropping a cellular phone. In order to detect an act in which a specific button of the manipulation member is pushed down at or over a predetermined pressure, a pressure sensor which detects the pressure applied on the button, or the like, may be provided. In order to detect an act in which the manipulation member is dropped, an acceleration sensor which detects the acceleration applied on a cellular phone, or the like, may be provided.

Hence, the inhibited-act detection section 42 conducts background processing while a main game is executed. This allows it to certainly detect a manipulation by a user being an inhibited act, without giving any obstacle to the execution of the main game.

If an inhibited, act is detected by the inhibited-act detection section 42, the operation execution section 43 executes a predetermined operation which suppresses the inhibited act of the user. It includes a suppression-information presentation section 431 which presents suppression information, a parameter change section 432, and a main-game termination section 433.

The suppression-information presentation section 431 presents, to the user, suppression information which suppresses the inhibited act of the user. According to this embodiment, as the suppression information, the suppression-information presentation section 431 displays, in the display section 34, a suppression picture which prompts the user to suppress the inhibited act.

If an inhibited act is detected by the inhibited-act detection section 42, the parameter change section 432 changes a parameter which corresponds to a character who appears in a main game.

If an inhibited act is detected by the inhibited-act detection section 42, the main-game termination section 433 terminates the main game forcedly. In addition, every time an inhibited act is detected by the inhibited-act detection section 42, the main-game termination section 433 presents, to the suppression-information presentation section 431, suppression information which is used to suppress an inhibited act by a user. It terminates the main game forcedly if the number of inhibited acts which are detected by the inhibited-act detection section 42 is equal to, or more than, a predetermined number of times.

The data storage section 32 is implemented by, for example, the flash memory 28 or the like. It stores various image data such as a game picture which is displayed in the display section 34, game data such as a parameter which corresponds to a character who appears in a main game, and the like. This image data is made up of data which is conformable to the GIF (or Graphics Interchange Format) standard, the JPEG (or Joint Photographic Experts Group) standard, or the like.

The program storage section 33 is implemented by, for example, the flash memory 28 or the like. It stores a manipulation suppression program as a video-game program. Herein, if a video game program is executed in a personal computer or a video game machine, a computer-readable record medium is attached, which functions as the program storage section 33.

The display section 34 is implemented by, for example, the liquid-crystal display section 23. The manipulation section 35 is implemented by, for example, the manipulation member 22.

Herein, according to this embodiment, the inhibited-act detection section 42 corresponds to the detecting means; the operation execution section 43, to the executing means; the suppression-information presentation section 431, to the presenting means; the parameter change section 432, to the game-situation changing means; and the main-game termination section 433, to the main-game terminating means.

Figure 4:
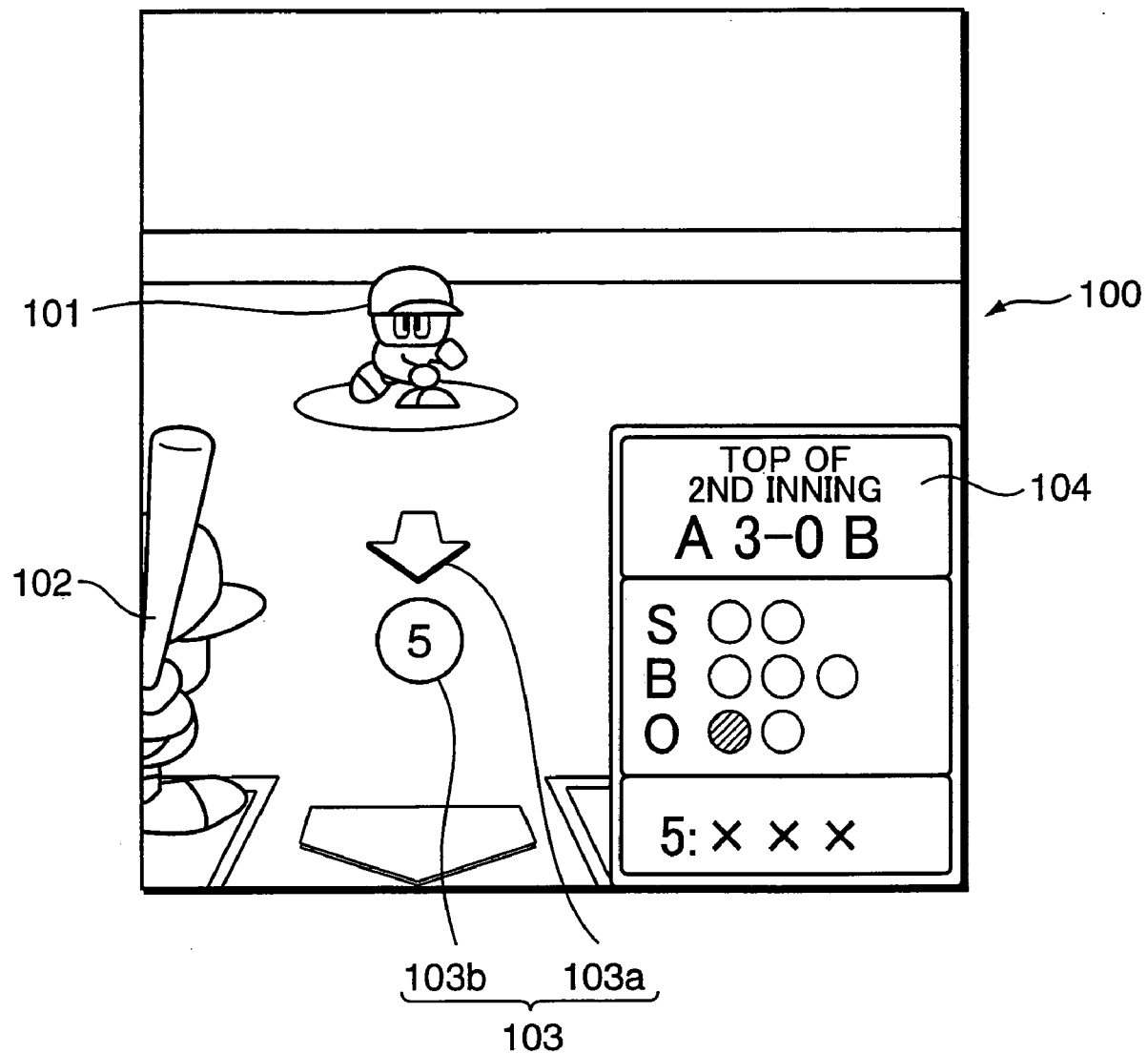
FIG. 4 is an illustration, showing an example of a main-game picture.

FIG. 4 is an illustration, showing an example of a main-game picture. If a main game is executed, for example, a main-game picture 100 is displayed in the liquid-crystal display section 23. According to this embodiment, the main game is a baseball game. Thus, on the main-game picture 100 shown in FIG. 4, there are displayed: a pitcher character 101 which is manipulated by a user; a batter character 102 which is manipulated by the CPU 21; an input-manipulation display section 103 which shows an input manipulation by the user; and a game-information display section 104 which shows various game information, such as the runs scored, a count, the name of a batter character and the like. On the main-game picture 100, the user is in the field. Hence, the user conducts an input manipulation to choose one from among given pitches and courses, respectively, so that the pitcher character 101 can make a pitching motion.

On the main-game picture 100 shown in FIG. 4, as shown in the game-information display section 104, the game is now in the top of the second inning. A team A which the batter character 102 belongs to plays a team B of the pitcher character 101. The count is no ball, no strike with one out. The batter character 102 is number 5 in the batting line-up, and his name is X X X.

The input-manipulation display section 103 is made up of a pitched-ball display section 103a, and a course display section 103b. The pitched-ball display section 103a shows a ball to be pitched which is inputted by the user, using the direction of its arrow. The arrow shown in FIG. 4 represents a straight pitch. The course display section 103b shows the course of a ball to be pitched which is inputted by the user. A strike zone which is virtually provided in a video-game space is divided into 3×3, or nine, areas. Among the divided nine areas, it shows which area a ball should be pitched into. Those areas are numbered 1 to 9, which each correspond to the buttons 1 to 9 of the manipulation member 22. The number 5 which is displayed in the course display section 103b shown in FIG. 4 indicates that the user has chosen the area 5 which is the center of the strike zone. It shows that the user has pressed the button of the manipulation member 22 which corresponds to the number 5.

Herein, the user pushes down the button of the manipulation member 22 which corresponds to the number 5 continually and repeatedly until the pitching motion of the pitcher character 101 is completed. This is a so-called repeated pushing act and may affect the cellular phone 2 adversely. Therefore, it is defined as an inhibited act in the manual or the like of the cellular phone 2. The manipulation suppression program according to the present invention suppresses an inhibited act by a user.

Figure 5:
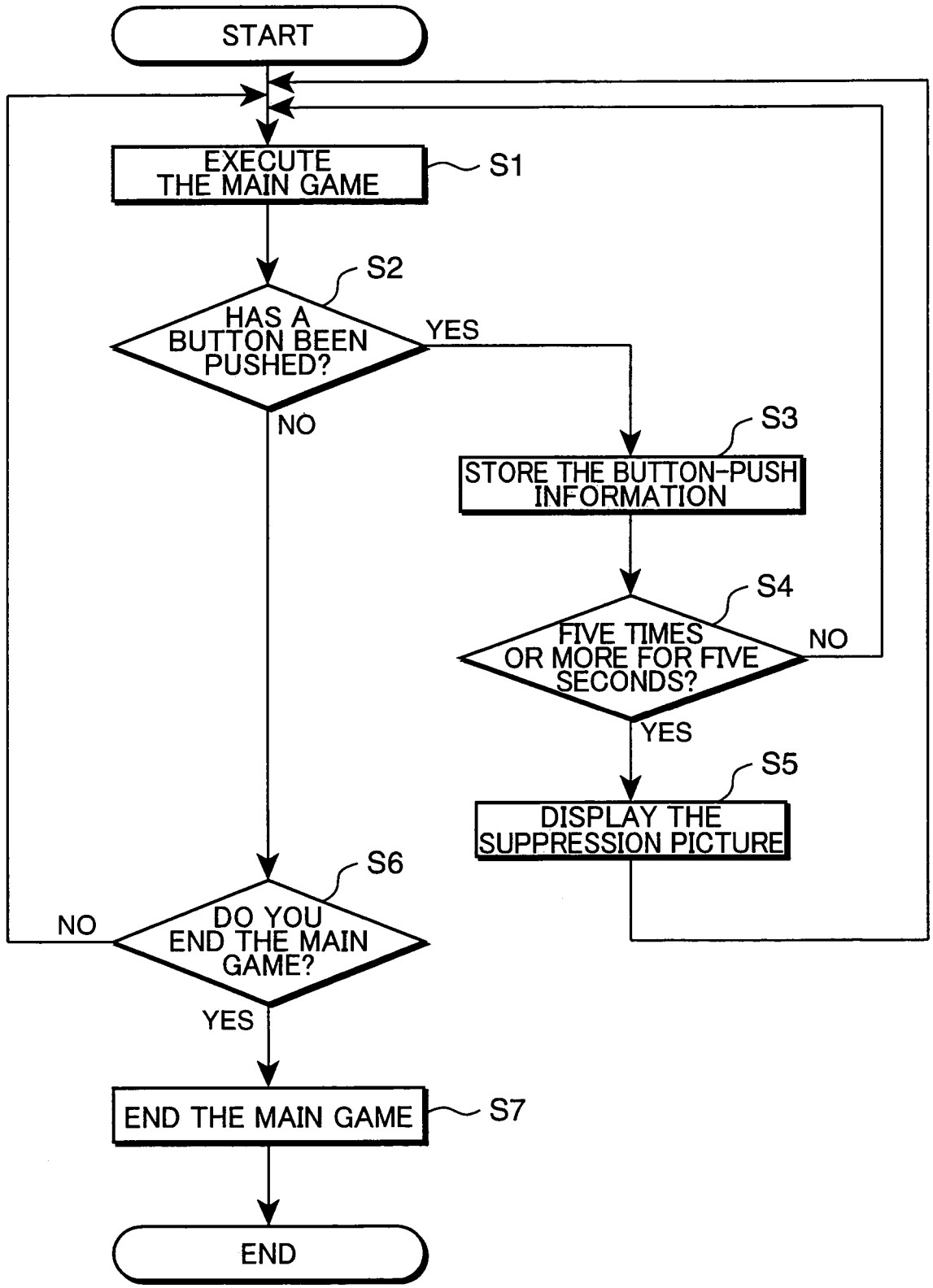
FIG. 5 is a flow chart, showing an example of manipulation suppression processing by the cellular phone shown in FIG. 2.

FIG. 5 is a flow chart, showing an example of manipulation suppression processing by the cellular phone 2 shown in FIG. 2. Herein, the manipulation suppression processing of the cellular phone 2 is processing which is conducted when the CPU 21 executes the manipulation suppression program. Herein, the Java applet which is a video game program is already stored in the flash memory 28 of the cellular phone 2.

In a step S1, the CPU 21 activates the Java applet which is stored in the flash memory 28, and executes a main game (i.e., a baseball game).

In a step S2, according to the progress of the main game, the CPU 21 accepts a push of the buttons which correspond to the manipulation member 22 by a user. If there is a push of a button (YES at the step S2), then the processing moves to a step S3. If there is no push of a button (NO at the step S2), then it goes to a step S6.

In the step S3, the CPU 21 stores, in the RAM 27, button-push information on which button that corresponds to the manipulation member 22 was pushed down and when it was.

In a step S4, based on the button-push information stored in the RAM 27, the CPU 21 detects one and the same button being continually pushed down five or more times during the period of five seconds. If the same button has been pushed down five times or more for five seconds (YES at the step S4), then the processing moves to a step S5. If it has been pushed down below five times (NO at the step S4), then a return is made to the step S1, and the main game is executed. Herein, according to this embodiment, one and the same button is detected being continually pushed down five or more times during the period of five seconds. However, the present invention is not limited especially to this. For example, the same button may also be detected being pushed down ten or more times for five seconds, or five or more times for three seconds. The detection time and the number of times of pushes may also be suitably changed.

In the step S5, the CPU 21 controls the liquid-crystal display section 23 so that it displays a suppression picture as a suppression information to suppress an inhibited act by the user. Then, the suppression picture is displayed in the liquid-crystal display section 23, during a given period of time, for example, for three seconds. Thereafter, a return is made to the step S1 to execute the main game. While the suppression picture is displayed, the main game stops temporarily. Herein, the period during which the suppression picture is displayed in the liquid-crystal display section 23 is not limited to three seconds, for example, it may also be five seconds. In short, it can be suitably changed.

In a step S6, the CPU 21 judges whether the execution of the main game should be ended. If a judgment is made that the execution of the main game should be ended (YES at the step S6), then the processing moves ahead to a step S7. If a judgment is made that the execution of the main game should not be ended (NO at the step S6), then it returns to the step S1 and the main game is executed.

In the step S7, the CPU 21 ends the execution of the main game.

In this way, a suppression information which is used to suppress an inhibited act by a user is presented. This notifies the user that he/she has conducted an inhibited act, thereby certainly suppressing the inhibited act.

Figure 6:
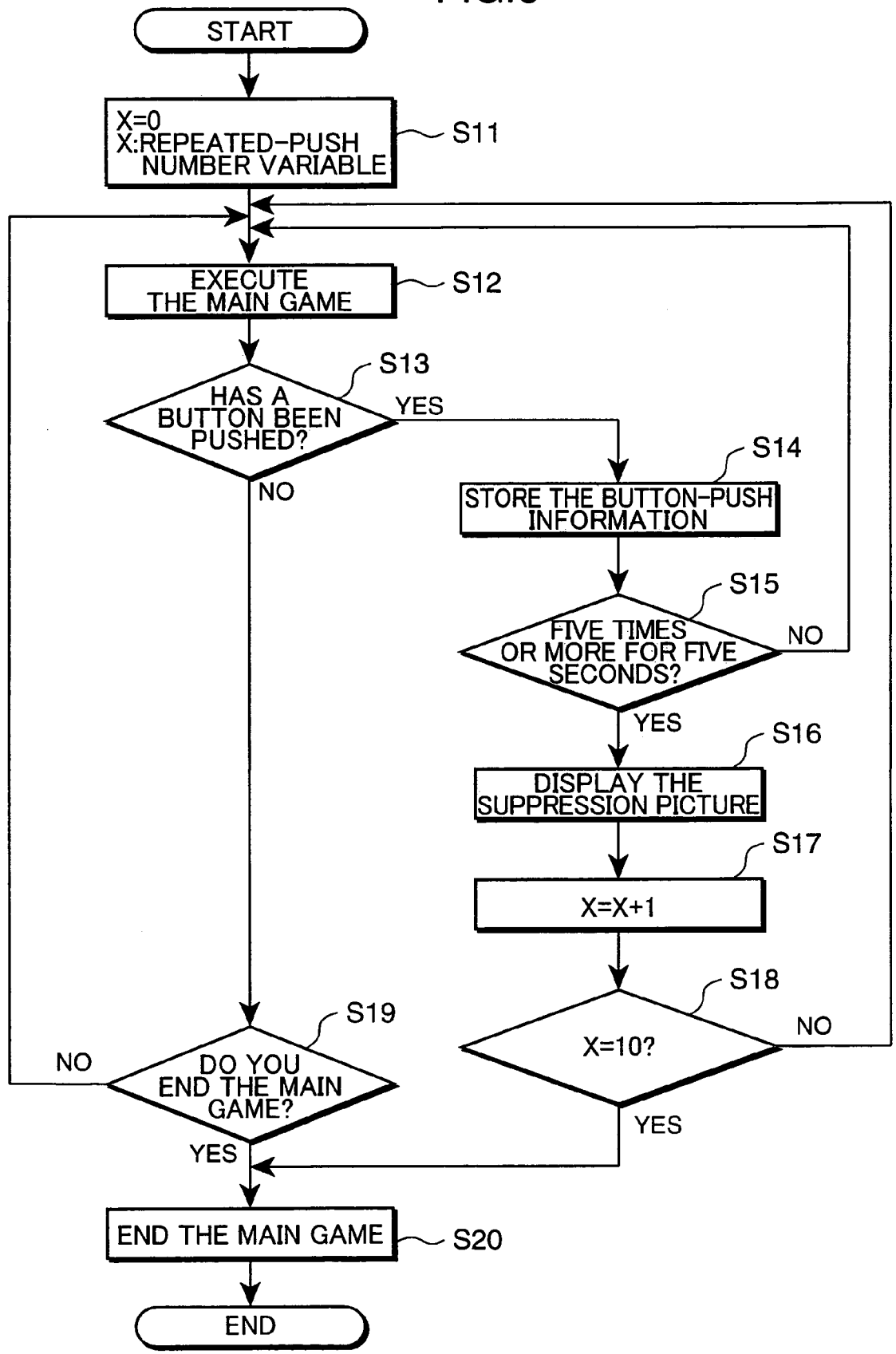
FIG. 6 is a flow chart, showing another embodiment of manipulation suppression processing by the cellular phone shown in FIG. 2.

FIG. 6 is a flow chart, showing another embodiment of manipulation suppression processing by the cellular phone 2 shown in FIG. 2. Herein, the manipulation suppression processing of the cellular phone 2 is processing which is conducted when the CPU 21 executes the manipulation suppression program. Herein, the Java applet which is a video game program is already stored in the flash memory 28 of the cellular phone 2.

In a step S11, the CPU 21 initializes a repeated-push number variable X which is the number of pushes at which a user presses one and the same button continually and repeatedly during a given period of time.

Processing in a step S12 is the same as the processing of the step S1 shown in FIG. 5, and thus, its description is omitted.

In a step S13, according to the progress of the main game, the CPU 21 accepts a push of the buttons of the manipulation member 22 by the user. If there is a push of a button (YES at the step S13), then the processing moves to a step S14. If there is no push of a button (NO at the step S13), then it goes to a step S19.

In the step S14, the CPU 21 stores, in the RAM 27, button-push information on which button that corresponds to the manipulation member was pushed down and when it was.

Processing in a step S15 is the same as the processing of the step S4 shown in FIG. 5, and thus, its description is omitted. Herein, if one and the same button has been continually pushed down five times or more for five seconds (YES at the step S15), then the processing moves to a step S16. If it has been pushed down below five times (NO at the step S15), then a return is made to the step S12.

Processing in the step S16 is the same as the processing of the step S5 shown in FIG. 5, and thus, its description is omitted.

In a step S17, the CPU 21 gives an increment of one to the repeated-push number variable X, which is the number of pushes at which the user presses one and the same button continually and repeatedly five times or more for five seconds.

In a step S18, the CPU 21 judges whether or not the repeated-push number variable X is ten. If a judgment is made that the repeated-push number variable X is ten (YES at the step S18), then the processing moves to a step S20, and the main game is forcedly terminated. If a judgment is made that the repeated-push number variable X is less than ten (NO at the step S18), then it returns to the step S12, and the main game is executed.

In a step S19, the CPU 21 judges whether or not the execution of the main game should be ended. If a judgment is made that the execution of the main game should be ended (YES at the step S19), then the processing moves to the step S20. If a judgment is made that the execution of the main game should not be ended (NO at the step S19), then it returns to the step S12, and the main game is executed.

In the step S20, the CPU 21 ends the execution of the main game.

Herein, in the step S15, the CPU 21 detects one and the same button being continually and repeatedly pushed down five or more times during the period of five seconds. If the same button has been continually and repeatedly pushed down five or more times for five seconds (YES at the step S15), then a shift may also made to the step S20 to terminate the main game forcedly. Besides, in the step S16, the suppression picture may also be displayed before a shift is made to the step S20 to terminate the main game forcedly.

As described above, if an inhibited act by a user is detected more than a predetermined number of times, the main game in execution is forcedly terminated. This allows a user to play a main game, even after the suppression information has suppressed the user's inhibited act. Only if a user conducts an inhibited act more than a predetermined number of times, the main game is forcedly terminated.

Therefore, inhibited acts which are repeatedly conducted by a user can be effectively suppressed, with the execution of the main game kept to some extent.

Figure 7:
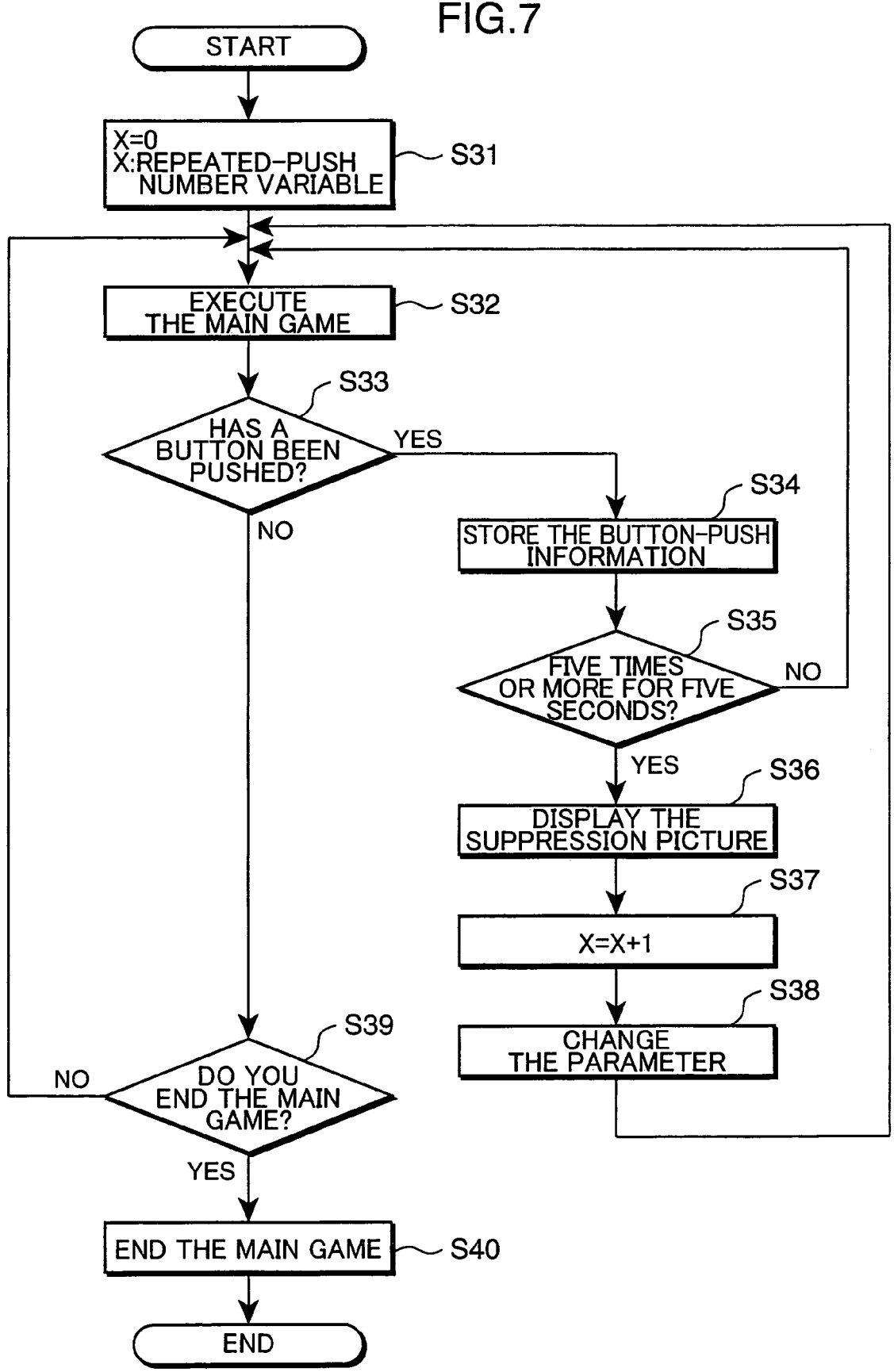
FIG. 7 is a flow chart, showing still another embodiment of manipulation suppression processing by the cellular phone shown in FIG. 2.

FIG. 7 is a flow chart, showing still another embodiment of manipulation suppression processing by the cellular phone 2 shown in FIG. 2. Herein, the manipulation suppression processing of the cellular phone 2 is processing which is conducted when the CPU 21 executes the manipulation suppression program. Herein, the Java applet which is a video game program is already stored in the flash memory 28 of the cellular phone 2.

Processing in a step S31 to a step S37 is the same as the processing of the step S11 to the step S17 shown in FIG. 6, and thus, its description is omitted.

In a step S38, according to the repeated-push number variable X, the CPU 21 changes the parameter of a character who appears in a main game which is manipulated by a user. Herein, the parameter is a parameter which corresponds to a character who appears in the main game, such as a state parameter which represents a state such as an amount of money that is spent by a character in a video-game space and a capacity parameter which represents a capacity such as the length of the life of a character in the video-game space. For example, the value of a parameter is changed according to the number of repeated pushes. Every time the repeated-push number increases by one, the value of a parameter which represents an amount of money decreases by one. Every time the repeated-push number increases by one, the value of a parameter which represents a life decreases by one. After the parameters have been changed, a return is made to a step 32, and a main game is executed.

Processing in a step S39 and a step S40 is the same as the processing of the step S19 and the step S20 shown in FIG. 6, and thus, its description is omitted.

Thus, if a user conducts an inhibited act while a main game is executed, the value of a parameter which represents the capacity of a character who appears in the main game is reduced according to the number of times of the inhibited act. Therefore, the user's game situation in the main game becomes unfavorable. Then, when the user wants the main game favorable, simple processing is conducted such as changing the value of a parameter, thereby suppressing the inhibited act effectively.

Figure 8:
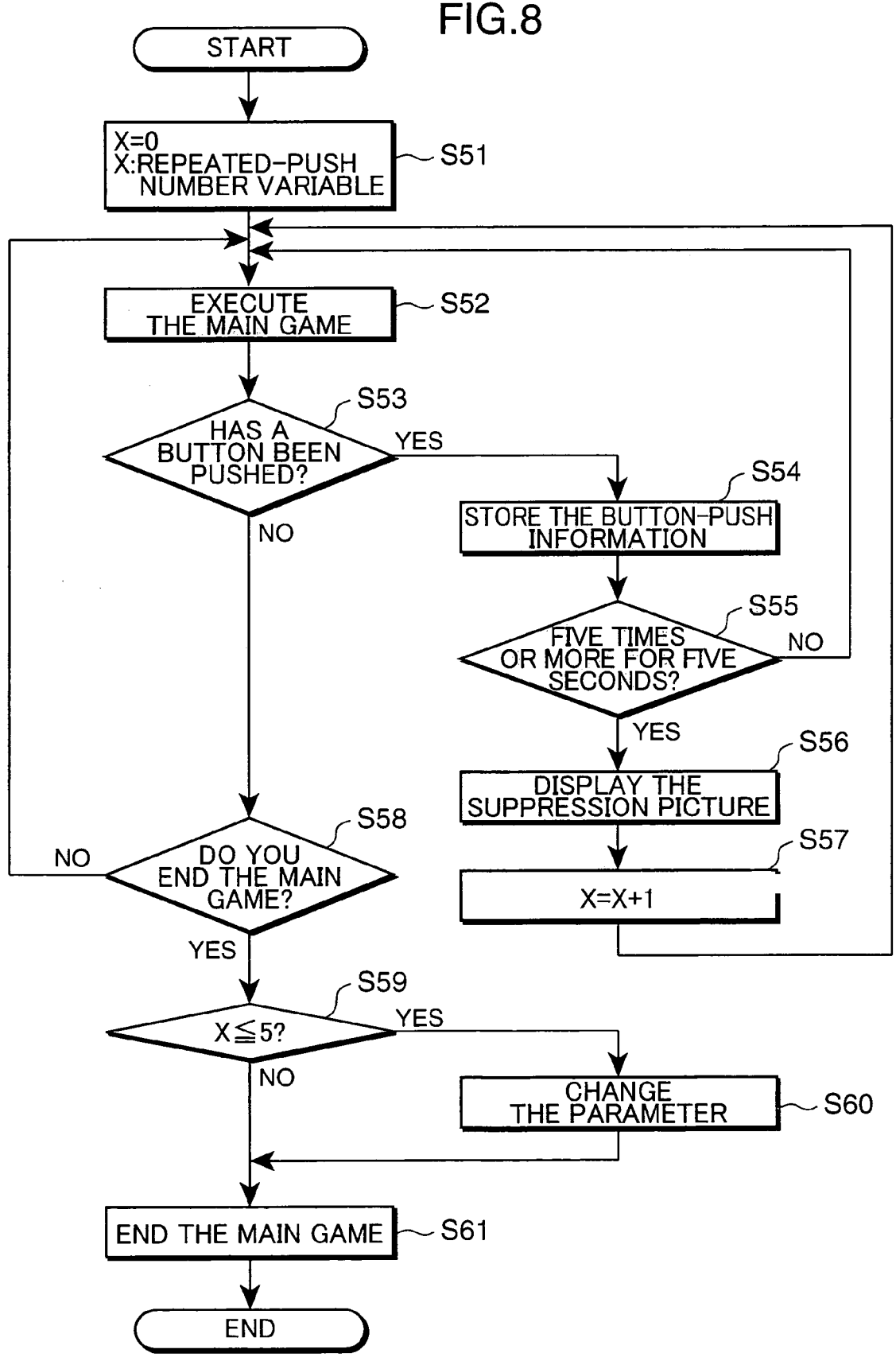
FIG. 8 is a flow chart, showing still another embodiment of manipulation suppression processing by the cellular phone shown in FIG. 2.

FIG. 8 is a flow chart, showing still another embodiment of manipulation suppression processing by the cellular phone 2 shown in FIG. 2. Herein, the manipulation suppression processing of the cellular phone 2 is processing which is conducted when the CPU 21 executes the manipulation suppression program. Herein, the Java applet which is a video game program is already stored in the flash memory 28 of the cellular phone 2.

Processing in a step S51 to a step S58 is the same as the processing of the step S31 to the step S37 shown in FIG. 7, and thus, its description is omitted.

In a step S59, the CPU 21 judges whether or not the repeated-push number variable X is five or less. In other words, a judgment is made on whether the repeated-push number variable X is a preset limited number of times (e.g., five according to this embodiment) or less than the limited number. If X≦5 (YES at the step S59), the processing moves forward to a step S60. If X>5 (NO at the step S59), it goes ahead to a step S61. Herein, according to this embodiment, the limited number of times is five. However, the present invention is not limited especially to this. For example, it may also be three times or the like. In short, it can be suitably changed.

In the step S60, the CPU 21 changes the parameter of a character who appears in a main game which is manipulated by a user. For example, if the repeated-push number variable X is the limited number of times (e.g., five according to this embodiment) or less at the time when a video game ends, the capacity parameter of a character in a video-game space is raised by one, or the like. Herein, the parameter may also be changed according to the repeated-push number variable X.

In the step S61, the CPU 21 ends the execution of the main game.

Hence, if an inhibited act by a user is a predetermined limited number of times or less, the value of a parameter which represents the capacity of a character who appears in a main game is increased. Therefore, the user's game situation in the main game becomes favorable. Then, when the user wants the main game favorable, simple processing is conducted such as changing the value of a parameter, thereby suppressing the inhibited act effectively.

Figure 9:
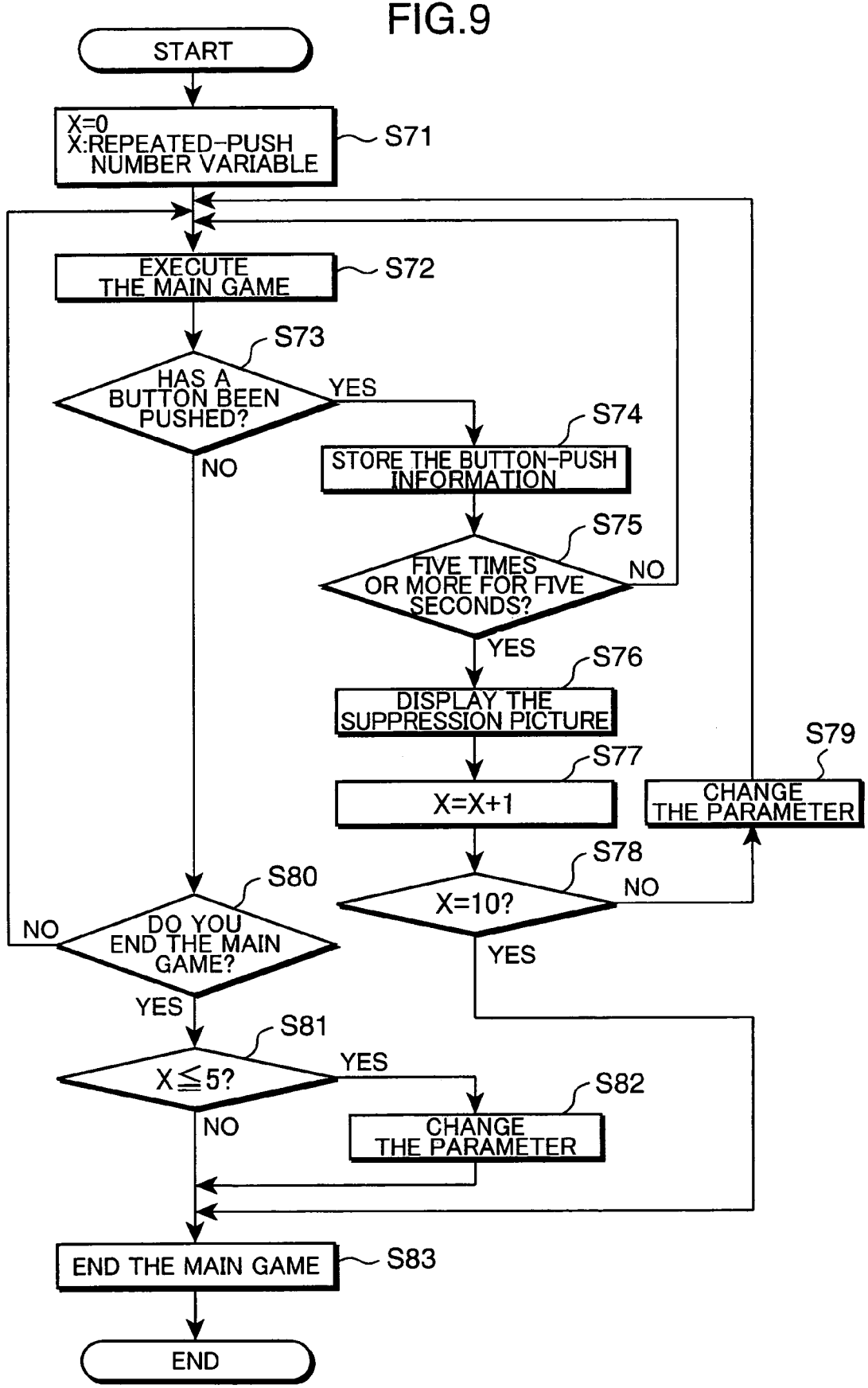

FIG. 9 is a flow chart, showing still another embodiment of manipulation suppression processing by the cellular phone 2 shown in FIG. 2. This is processing which is formed by combining the processing shown in FIG. 5 to FIG. 8. Herein, the manipulation suppression processing of the cellular phone 2 is processing which is conducted when the CPU 21 executes the manipulation suppression program. Herein, the Java applet which is a video game program is already stored in the flash memory 28 of the cellular phone 2.

Processing in a step S71 to a step S77 is the same as the processing of the step S11 to the step S17 shown in FIG. 6, and thus, its description is omitted.

In a step S78, the CPU 21 judges whether or not the repeated-push number variable X is ten. If a judgment is made that the repeated-push number variable X is ten (YES at the step S78), the processing moves forward to a step S83 to terminate the main game forcedly. If a judgment is made that the repeated-push number variable X is below ten (NO at the step S78), it goes ahead to a step S79.

Processing in the step S79 is the same as the processing of the step S38 shown in FIG. 7, and thus, its description is omitted.

Processing in a step S80 to a step S83 is the same as the processing of the step S58 to the step S61 shown in FIG. 8, and thus, its description is omitted.

In this way, the processing of FIG. 5 to FIG. 8 is combined, and thus, a video game becomes more complex. This suppresses an inhibited act by a user more effectively.

Figure 10:
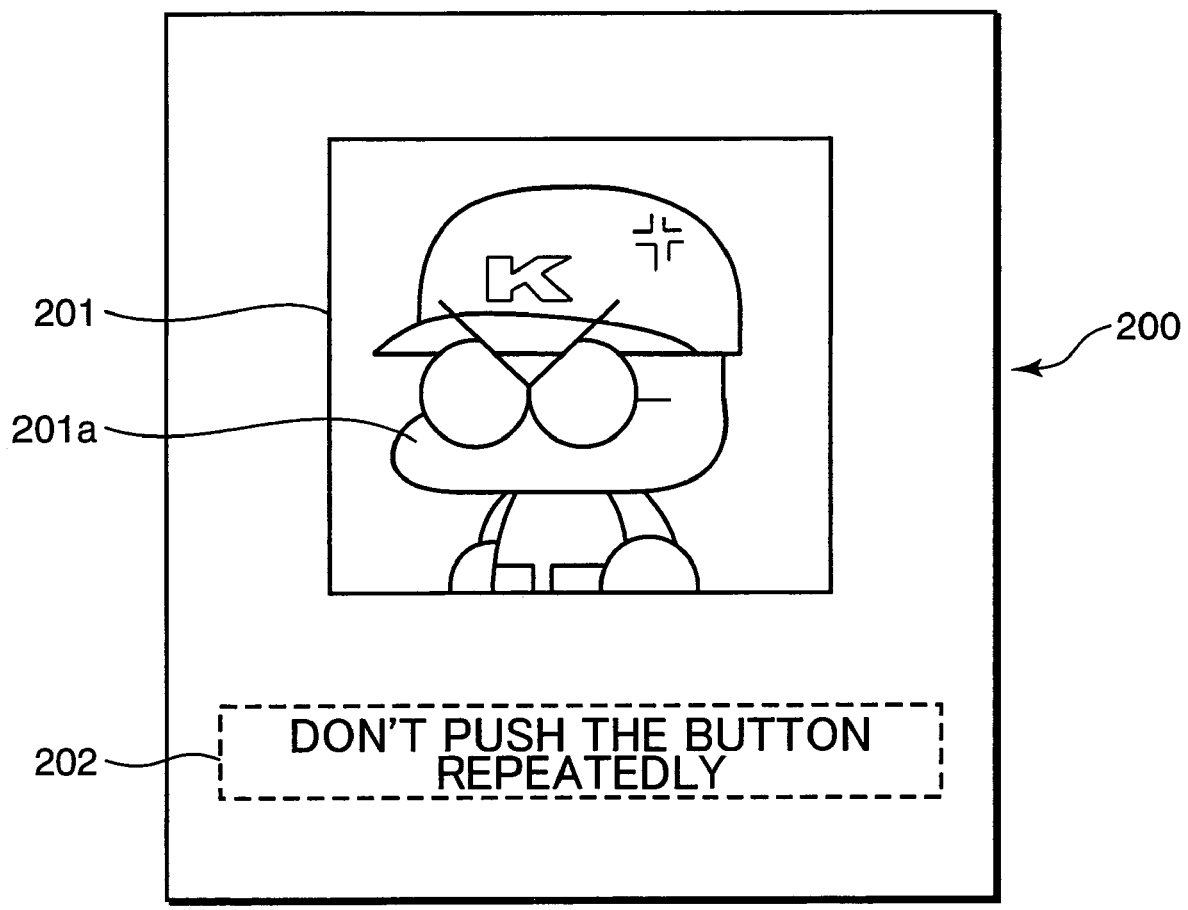
FIG. 10 is an illustration, showing an example of a suppression picture.

FIG. 10 is an illustration, showing an example of a suppression picture. If the CPU 21 detects a user pressing the button which corresponds to number 5 continually and repeatedly five times or more for five seconds while a main game is executed, then a suppression picture 200 which is used to suppress the inhibited act of the user is displayed in the liquid-crystal display section 23. In the suppression picture 200 shown in FIG. 10, there are displayed a character display section 201 which displays a character who appears in the main game, and a sentence display section 202 which displays a sentence which prompts the user to suppress an inhibited act. In the character display section 201, a character 201a who appears in the main game is displayed. In the sentence display section 202, a sentence is displayed which means "Don't push the button repeatedly!", so that a user's act of continually and repeatedly pressing a specific button several times can be suppressed. Herein, the sentence which is displayed this sentence display section 202 is not limited to this example. Another sentence may also be displayed which prompts a user to suppress an inhibited act. In addition, the suppression picture 200 may also display only the sentence display section 202, without displaying the character display section 201.

As described above, the suppression picture 200 which suppresses an inhibited act by a user is displayed. This allows a user who has conducted an inhibited act to turn his/her attention to it visually. Therefore, the user can confirm the displayed suppression picture 200, and thereby, the user himself/herself can become aware that the user has conducted the inhibited act. As a result, an inhibited act by a user can be suppressed. Besides, even if a user is in a place where a phonetic sound is inaudible, such as in a crowd, or the cellular phone 2 is set in a manners mode where a phonetic sound is not outputted outside, then the user can confirm the displayed suppression picture 200 as long as the displayed suppression picture 200 is displayed. This allows the user himself/herself to become aware that he/she has conducted the inhibited act. As a result, an inhibited act by a user can be suppressed.

Herein, the suppression picture 200 which suppresses an inhibited act by a user may also be an dynamic picture image. In that case, the character 201 which is displayed on the suppression picture 200 is displayed, using an dynamic picture image (or animation). This makes it easier to perceive the suppression picture 200.

In addition, according to this embodiment, a video game which is performed only using the cellular phone 2 has been described. However, the present invention is not limited especially to this. A video game may also be used which is performed by transmitting/receiving game data such as a parameter to/from the Web server 1. In that case, every time access is given to the database of the Web server 1, the repeated-push number variable X is delivered. Then, the game data (i.e., the parameter of a character who appears in the video game) is changed in the Web server 1. Furthermore, the number of times of repeated pushes by a user may also be stored in the Web server 1. In that case, if the repeated-push number reaches a predetermined number of times (e.g., thirty times) within a predetermined period of time (e.g., one month), then the user is notified of suppression information which suppresses an inhibited act by a user, by electronic mail or the like. Then, the parameter of a character who appears in the video game is reduced. Then, if the repeated-push number is below a predetermined number of times (e.g., three times) within a predetermined period of time (e.g., one month), the user is informed of that result by electronic mail or the like. Then, the parameter of a character who appears in the video game is raised.

Moreover, according to this embodiment, if the number of times of pushes which have been repeated by a user is ten times, then the execution of a main game is forcedly terminated. However, the present invention is not limited especially to this. For example, the repeated-push number may also be five or fifteen times. In short, it can be suitably changed. In this way, a predetermined number of times and a suppression picture are displayed, and thereafter, the execution of a main game is forcedly terminated. This suppresses an inhibited act by a user more effectively.

Furthermore, the suppression-information presentation section 431 may also present suppression information by outputting, to the outside of the cellular phone 2, a suppression sound and voice which suppresses an inhibited act by a user. In other words, if a user conducts an inhibited act while a main game is executed, then as the suppression information which is used to suppress the inhibited act, a sound and a voice are outputted from the audio output section 25 to the outside of the cellular phone 2. These sound and voice prompt the user to suppress the inhibited act. For example, if a user pushes down a specific button continually and repeatedly, a warning sound is outputted. Herein, in addition to this warning sound, as the sound which is outputted to the outside of the cellular phone 2 as the suppression information, the sentence of "Don't push the button repeatedly!" may also be outputted in a voice.

In addition, the suppression-information presentation section 431 may also present the suppression information which suppresses an inhibited act by a user, by vibrating a video game machine (i.e., the cellular phone 2). In other words, if the user conducts an inhibited act while a main game is executed, then the vibration generation unit 24 vibrates the cellular phone 2 at a predetermined vibration frequency. This prompts the user to suppress the inhibited act.

Moreover, the suppression information which is used to suppress an inhibited act by a user may also be presented by combining any two, or all, of a suppression picture, a sound and a voice, and a vibration. In other words, when the suppression picture 200 shown in FIG. 6 is displayed, the sentence of "Don't push the button repeatedly!" is outputted in a voice to the outside of the cellular phone 2. In addition to this, the cellular phone 2 is vibrated. Hence, the suppression information is presented in visual, auditory and tactile senses, thereby suppressing an inhibited act more effectively.

Furthermore, according to this embodiment, the main game has been described using a baseball game. However, the present invention is not limited especially to this. Various video games can be applied, such as another sports game, a nurture game, a role-playing game and a shooting game.

As described hereinbefore, the manipulation suppression program which is used to suppress a predetermined manipulation by a user allows a video game machine to function as: a detecting means for detecting a manipulation by the user being a preset inhibited act; and an executing means for, if the inhibited act is detected by the detecting means, executing a predetermined operation which suppresses the inhibited act of the user.

In other words, by the detecting means, a manipulation by the user while a main game is executed is detected being the preset inhibited act; and by the executing means, the predetermined operation which suppresses the inhibited act of the user is executed.

Herein, the inhibited act is applicable to an act which may adversely affect the endurance or the like of a video game machine, particularly a cellular phone. Such an act includes a user's act of continually and repeatedly pushing down a specific button of a manipulation member a predetermined number of times, the act of pressing a specific button of the manipulation member at or over a predetermined pressure, the act of applying force from outside such as dropping the manipulation member, and another such act.

Hence, if a user conducts an inhibited act which may damage a video game machine, the predetermined operation which suppresses the inhibited act is executed. This allows the user to become aware of the inhibited act, thereby suppressing the inhibited act of the user.

Furthermore, the inhibited act may also include a user's act of continually pushing down a manipulation member which is provided in the video game machine. In that case, the user's act of continually pressing the manipulation member which is provided in the video game machine can be suppressed. This prevents the endurance of the manipulation member of the video game machine from deteriorating unnecessarily.

Moreover, the manipulation suppression program which is used to suppress a predetermined manipulation by a user while a main game is executed allows a video game machine to function as: a detecting means for detecting a manipulation by the user being a preset inhibited act; and an executing means for, if the inhibited act is detected by the detecting means, executing a predetermined operation which suppresses the inhibited act of the user.

In other words, by the detecting means, a manipulation by the user is detected being the preset inhibited act; and by the executing means, the predetermined operation which suppresses the inhibited act of the user is executed.

Herein, the inhibited act is applicable to an act which may adversely affect the endurance or the like of a video game machine, particularly a cellular phone. Such an act includes a user's act of continually and repeatedly pushing down a specific button of a manipulation member a predetermined number of times, the act of pressing a specific button of the manipulation member at or over a predetermined pressure, the act of applying force from outside such as dropping the manipulation member, and another such act.

Hence, if a user conducts an inhibited act which may damage a video game machine while a main game is executed, the predetermined operation which suppresses the inhibited act is executed. This allows the user to become aware of the inhibited act, thereby suppressing the inhibited act of the user.

The executing means includes a presenting means for presenting suppression information which is used to suppress an inhibited act by the user. In other words, a suppression information which is used to suppress an inhibited act by a user is presented. This notifies the user that he/she has conducted an inhibited act, thereby certainly suppressing the inhibited act.

The presenting means displays a suppression picture which is used to suppress an inhibited act by a user. In other words, by the presenting means, the suppression picture which suppresses an inhibited act by the user is displayed. This allows the user who has conducted the inhibited act to turn his/her attention to it visually. Therefore, even in a place where a sound is inaudible, such as in a crowd, the user can confirm the displayed suppression picture, allowing the user himself/herself to become aware that he/she has conducted the inhibited act.

The executing means includes a game-situation changing means for changing a game situation of the main game if an inhibited act is detected by the detecting means. In other words, if a user conducts an inhibited act while a main game is executed, the game situation of the main game can be made unfavorable for the user. Thereby, the inhibited act of the user who wants the main game favorable can be effectively suppressed.

The game-situation changing means changes a parameter which corresponds to a character who appears in the main game. In other words, if a user conducts an inhibited act while a main game is executed, for example, the value of a parameter which represents the capacity of a character who appears in the main game is reduced. Therefore, the user's game situation in the main game becomes unfavorable. Then, when the user wants the game situation of the main game favorable, simple processing is conducted such as changing the value of a parameter, thereby suppressing the inhibited act effectively.

The executing means includes a main-game terminating means for terminating the main game forcedly if an inhibited act is detected by the detecting means. In other words, by the main-game terminating means, the main game is terminated based on the inhibited act by the user which has been detected by the detecting means. This makes it impossible for the user who has conducted the inhibited act to continue playing the main game any more. Thereby, the user who wants to play the main game gets to avoid the inhibited act, thus more certainly suppressing the inhibited act by the user.

The main-game terminating means: presents, to the presenting means, suppression information which is used to suppress an inhibited act by a user, every time the inhibited act is detected by the detecting means; and terminates the main game forcedly if the number of inhibited acts which are detected by the detecting means is equal to, or more than, a predetermined number of times. In other words, if an inhibited act by a user is detected more than a predetermined number of times, the suppression information is presented and the main game in execution is forcedly terminated. Therefore, This allows a user to play a main game, even after the suppression information has suppressed the user's inhibited act. Only if the user conducts the inhibited act more than the predetermined number of times, the main game is forcedly terminated. Thus, the inhibited act which is repeatedly conducted by the user can be effectively suppressed, with the execution of the main game kept to some extent.

Furthermore, the detecting means may also detect a manipulation by a user being a preset inhibited act, by background processing which is conducted while a main game is executed. In that case, the detecting means for detecting a manipulation by a user being a preset inhibited act is background processing while a main game is executed. This allows it to certainly detect a manipulation by a user being an inhibited act, without giving any obstacle to the execution of the main game.

Moreover, the video game machine may also be a cellular phone which has a button as a manipulation member. In that case, the video game machine is a cellular phone which has a button as a manipulation member. Therefore, if a main game is executed using a cellular phone which is inferior in endurance to a video game machine which is used only for a video game, then an inhibited act can be suppressed. This allows a cellular phone having both a telephone function and a video-game function to be used with the intrinsic life of the cellular phone remaining as it is.

In addition, the manipulation suppression method which suppresses a manipulation by a user includes the steps of: allowing a video game machine to detect a manipulation by the user being a preset inhibited act; and allowing the video game machine to, if the inhibited act is detected in the detecting step, execute a predetermined operation which suppresses the inhibited act of the user.

Furthermore, the manipulation suppression method which suppresses a predetermined manipulation by a user while a main game is executed includes the steps of: detecting a manipulation by the user being a preset inhibited act; and if the inhibited act is detected in the detecting step, executing a predetermined operation which suppresses the inhibited act of the user.

In other words, a manipulation by a user is detected being a preset inhibited act, and a predetermined operation which suppresses the inhibited act of the user is executed.

Herein, the inhibited act is applicable to an act which may adversely affect the endurance or the like of a video game machine, particularly a cellular phone. Such an act includes a user's act of continually and repeatedly pushing down a specific button of a manipulation member a predetermined number of times, the act of pressing a specific button of the manipulation member at or over a predetermined pressure, the act of applying force from outside such as dropping the manipulation member, and another such act.

Hence, if a user conducts an inhibited act which may damage a video game machine, the predetermined operation which suppresses the inhibited act is executed. This allows the user to become aware of the inhibited act, thereby suppressing the inhibited act of the user.

Furthermore, the video game machine which suppresses a manipulation by a user includes: a detecting means for detecting a manipulation by the user being a preset inhibited act; and an executing means for, if the inhibited act is detected by the detecting means, executing a predetermined operation which suppresses the inhibited act of the user. In other words, by the detecting means, a manipulation by the user is detected being the preset inhibited act; and by the executing means, the predetermined operation which suppresses the inhibited act of the user is executed.

Herein, the inhibited act is applicable to an act which may adversely affect the endurance or the like of a video game machine, particularly a cellular phone. Such an act includes a user's act of continually and repeatedly pushing down a specific button of a manipulation member a predetermined number of times, the act of pressing a specific button of the manipulation member at or over a predetermined pressure, the act of applying force from outside such as dropping the manipulation member, and another such act.

Hence, if a user conducts an inhibited act which may damage a video game machine, the predetermined operation which suppresses the inhibited act is executed. This allows the user to become aware of the inhibited act, thereby suppressing the inhibited act of the user.

INDUSTRIAL APPLICABILITY

The present invention has the following desirable advantages, and thus, its industrial applicability is great.

If a user conducts an inhibited act which may damage a video game machine, the predetermined operation which suppresses the inhibited act is executed. This allows the user to become aware of the inhibited act, thereby suppressing the inhibited act of the user.

If a user conducts an inhibited act which may damage a video game machine while a main game is executed, the predetermined operation which suppresses the inhibited act is executed. This allows the user to become aware of the inhibited act, thereby suppressing the inhibited act of the user.

The suppression information which is used to suppress an inhibited act by a user is presented. This notifies the user that he/she has conducted an inhibited act, thereby certainly suppressing the inhibited act.

The suppression picture which suppresses an inhibited act by a user is displayed. This allows the user to turn his/her attention to it visually. Therefore, even in a place where a sound is inaudible, such as in a crowd, the user can confirm the displayed suppression picture, allowing the user himself/herself to become aware that he/she has conducted the inhibited act.

If a user conducts an inhibited act while a main game is executed, the game situation of the main game can be made unfavorable for the user. Thereby, the inhibited act of the user who wants the main game favorable can be effectively suppressed.

If a user conducts an inhibited act while a main game is executed, for example, the value of a parameter which represents the capacity of a character who appears in the main game is reduced. Therefore, the user's game situation in the main game becomes unfavorable. Then, when the user wants the game situation of the main game favorable, simple processing is conducted such as changing the value of a parameter, thereby suppressing the inhibited act effectively.

Based on an inhibited act by a user, the main game is terminated. This makes it impossible for the user who has conducted the inhibited act to continue playing the main game any more. Thereby, the user who wants to play the main game gets to avoid the inhibited act, thus more certainly suppressing the inhibited act by the user.

If an inhibited act by a user is detected more than a predetermined number of times, the suppression information is presented and the main game in execution is forcedly terminated. Therefore, This allows a user to play a main game, even after the suppression information has suppressed the user's inhibited act. Only if the user conducts the inhibited act more than the predetermined number of times, the main game is forcedly terminated. Thus, the inhibited act which is repeatedly conducted by the user can be effectively suppressed, with the execution of the main game kept to some extent.

If a user conducts an inhibited act which may damage a video game machine, the predetermined operation which suppresses the inhibited act is executed. This allows the user to become aware of the inhibited act, thereby suppressing the inhibited act of the user.

If a user conducts an inhibited act which may damage a video game machine, the predetermined operation which suppresses the inhibited act is executed. This allows the user to become aware of the inhibited act, thereby suppressing the inhibited act of the user.

The invention claimed is:

1. A recording medium having stored thereon in executable form a game program and a manipulation suppression program which is used to suppress a predetermined manipulation by a user while a game of the game program is executed wherein the manipulation suppression program is configured so as to control a programmable device to function as a video game machine comprising:
   game execution means for executing the game program including accepting manipulations of the programable device;
   a detecting means for detecting the predetermined manipulation by the user during said execution of the came program wherein the predetermined manipulation adversely affects the programmable device;
   an executing means, responsive to the predetermined manipulation being dectected by the detecting means, executing a predetermined suppression operation which suppresses the predetermined manipulation of the user when the predetermined manipulation is detected;
   said predetermined manipulation adversely affecting a life span of the programmable device;
   said predetermined suppression operation adversely changing a parameter representing a capacity of a character, operated by the user in the game, in response to the predetermined manipulation being detected by the detecting means,
   said detecting means detecting a player manipulation and determining that said predetermined manipulation exists when said player manipulation is detected a predetermined number of times within a predetermined period; and
   a parameter change device which favorably altering the game parameter representing the capacity of the character in response to said detecting means detecting said player manipulation less than said predetermined number of times within said predetermined period.

2. A recording medium having stored thereon in executable form a game program and a manipulation suppression program which is used to suppress a predetermined manipulation by a user while a game of the game program is executed wherein the manipulation suppression program is configured so as to control a programmable device to function as a video game machine comprising:

game execution means for executing the game of the game program including accepting manipulations of the programmable device;

a detecting means for detecting the predetermined manipulation by the user during said execution of the game program wherein the predetermined manipulation adversely affects the programmable device;

an executing means, responsive to the predetermined manipulation being detected by the detecting means, executing a predetermined suppression operation which suppresses the predetermined manipulation of the user when the predetermined manipulation is detected;

said predetermined manipulation adversely affecting a life span of the programmable device;

said detecting means detecting a player manipulation and determining that said predetermined manipulation exists when said player manipulation is detected a predetermined number of times within a predetermined period; and a parameter change device which favorably altering a game parameter representing a capacity of a game character in response to said detecting means detecting said player manipulation less than said predetermined number of times within said predetermined period.

* * * * *